US012712638B2

(12) United States Patent
Hollmann et al.

(10) Patent No.: US 12,712,638 B2
(45) Date of Patent: Aug. 18, 2026

(54) FREE-SPACE OPTICAL COMMUNICATION SENSORS

(71) Applicant: The Charles Stark Draper Laboratory, Inc., Cambridge, MA (US)

(72) Inventors: Joseph Hollmann, Cambridge, MA (US); Leonardo Gallo, Cambridge, MA (US); Kerri Cahoy, Cambridge, MA (US); Paul Serra, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 164 days.

(21) Appl. No.: 18/632,647

(22) Filed: Apr. 11, 2024

(65) Prior Publication Data

US 2024/0348342 A1 Oct. 17, 2024

Related U.S. Application Data

(60) Provisional application No. 63/495,424, filed on Apr. 11, 2023.

(51) Int. Cl.
*H04B 10/60* (2013.01)
*H04B 10/11* (2013.01)

(52) U.S. Cl.
CPC ............. *H04B 10/60* (2013.01); *H04B 10/11* (2013.01)

(58) Field of Classification Search
CPC ................................ H04B 10/60; H04B 10/11
USPC ........................................................ 398/11
See application file for complete search history.

(56) References Cited

U.S. PATENT DOCUMENTS 6,334,098 B1 * 12/2001 Shefer .................... H04N 23/76 348/E5.041
9,813,151 B2 * 11/2017 Kingsbury ......... H04B 7/18515
2017/0054499 A1 * 2/2017 Graves ................... H04B 10/40
2019/0361098 A1 * 11/2019 Hollmann ............. G01S 7/4863
2023/0213713 A1 * 7/2023 Izuhara ................ G02B 6/4204 385/14
2024/0348342 A1 * 10/2024 Hollmann ............. H04B 10/60

FOREIGN PATENT DOCUMENTS

JP 2001502872 A * 2/2001 ........... H04N 5/3745
WO WO-2017216526 A1 * 12/2017 ........... H04B 10/112

OTHER PUBLICATIONS

Bashir et al; Signal Acquisition With Photon-Counting Detector Arrays in Free-Space Optical Communications- Apr. 2020, IEEE, pp. 1-15. (Year: 2020).*

(Continued)

*Primary Examiner* — Amritbir K Sandhu
(74) *Attorney, Agent, or Firm* — Brooks Kushman, P.C.

(57) ABSTRACT

An optical sensor system for communication and pointing may include an optical sensor having photocells arranged in an array configured to receive at least one optical signal, and the optical sensor, in response to the optical signal, generating a first output signal and a second output signal, wherein the first output signal represents instantaneous photon flux of the received optical signal and the second output signal represents a derivative of the instantaneous photon flux of the received optical signal where the optical sensor operates as a dual communication and pointing sensor.

15 Claims, 10 Drawing Sheets

(56) References Cited

OTHER PUBLICATIONS

Brian et al; Real Time Photon-Counting Receiver for High Photon Efficiency Optical Communications ; 2019; IEEE, pp. 1-6. ( Year: 2019).*
Brian et al; Real Time Photon-Counting Receiver for High Photon Efficiency Optical Communications, 2019, IEEE 1-6. (Year: 2019).*

* cited by examiner (b) Quadcell sensitivity at varying incident photons (a) Quadcell response at varying incident photons (b) Quadcell Beam Diameter Sensitivity (a) Quadcell response at various beam diameters (b) Quadcell Gap Slope Sensitivity (a) Quadcell response at different gap lengths (b) Quadcell Gap Slope with an OD6 filter (a) Quadcell response with an OD4 filter

FREE-SPACE OPTICAL COMMUNICATION SENSORS

CROSS-REFERENCE TO RELATED APPLICATIONS

This application claims the benefit of U.S. provisional application Ser. No. 63/495,424 filed Apr. 11, 2023, the disclosure of which is hereby incorporated in its entirety by reference herein.

TECHNICAL FIELD

Disclosed herein are free-space optical communication sensors.

BACKGROUND

Free-space optical communication (FSOC) using lasers (i.e., lasercom) is a leading contender for future space-based communication systems with potential advantages over radio frequency (RF) communication systems in size, weight, and power consumption (SWaP). Key benefits of lasercom are provided by the shorter wavelengths of optical signals, as compared to RF signals. For example, optical signals can provide more bandwidth and narrower beam widths than RF signals. A narrower beam supports a higher energy density, for a given aperture size, so, for example, lasercom systems can transmit data with reduced SWaP, without compromising data rate. Link security is improved, because the beam footprint is smaller. Lasercom is, therefore, an attractive option for improving inter-satellite links (ISL) for resource-constrained CubeSats, which have emerged as a standard form for small satellites.

In a lasercom ISL, one satellite modulates a laser beam directed to another satellite, which detects the laser beam with an optical sensor and demodulates the signal to extract a communicated message. However, due to its narrower beam width, a lasercom system requires much more accurate pointing than an RF system.

Accurate pointing is not trivial for most CubeSat platforms due to their resource constraints. Spacecraft typically include attitude determination and control systems (ADCS) and orbit determination (OD) systems to maintain optimal orientation. For example, large satellites typically employ gyroscopes to measure rotation rates and reaction wheels to control satellite attitudes. However, a typical 3U CubeSat is 34 cm×10 cm×10 cm with less than 5 kg mass and about 10 W of available orbit-average power. Fitting a high-quality gyroscope and reaction wheels into such a small SWaP budget is often not possible. For an ISL, a satellite must also estimate the other satellite's position, which consumes additional SWaP budget.

Furthermore, satellite body pointing provided by an ADCS and OD is insufficient, by itself, to accurately point a lasercom system's laser beam, due to the extremely narrow beam desired for high-rate communications. For example, a typical attitude control frequency of a CubeSat ADCS is less than 10 Hz. Thus, a fine pointing system (FPS) is necessary to control the communication laser beam to compensate errors between attitude control time steps. A FPS may, for example, include a miniature micro-electro-mechanical systems (MEMS) fast steering mirror (FSM) to point the communication laser beam. However, the FPS requires data to aim the FSM. This data is derived from a pointing laser and a separate optical sensor.

The two lasers (communication laser and pointing laser) operate at different wavelengths to minimize cross-talk. The two optical detectors (communication optical detector and pointing optical detector) have separate amplification chains, and both systems have relatively tight bandwidth constraints to minimize the effects of electrical noise. Each system draws on the SWaP budget.

SUMMARY

An optical sensor system for communication and pointing may include an optical sensor having photocells arranged in an array configured to receive at least one optical signal, and the optical sensor, in response to the optical signal, generating a first output signal and a second output signal, wherein the first output signal represents instantaneous photon flux of the received optical signal and the second output signal represents a derivative of the instantaneous photon flux of the received optical signal where the optical sensor operates as a dual communication and pointing sensor.

An optical sensor for communication and pointing may include a plurality of photocells arranged in parallel and configured to receive at least one optical signal, and in response to the optical signal, the optical sensor configured to generate a first output signal and a second output signal, wherein the first output signal represents instantaneous photon flux of the received optical signal and the second output signal represents a derivative of the instantaneous photon flux of the received optical signal.

An optical communication system may include a laser, a fine pointing system configured to direct an output of the laser in a direction according to a control signal, an optical sensor configured to detect an optical signal impinging thereon and simultaneously produce a first output signal and a second output signal, wherein the first output signal represents instantaneous photon flux of the optical signal impinging on the optical sensor and the second output signal represents a derivative of the instantaneous photon flux of the optical signal impinging on the optical sensor, and a controller configured to: receive the first and second output signals from the optical sensor, generate the control signal according to the first output signal from the optical sensor, and generate a communication output signal according to the second output signal from the optical sensor.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 2:
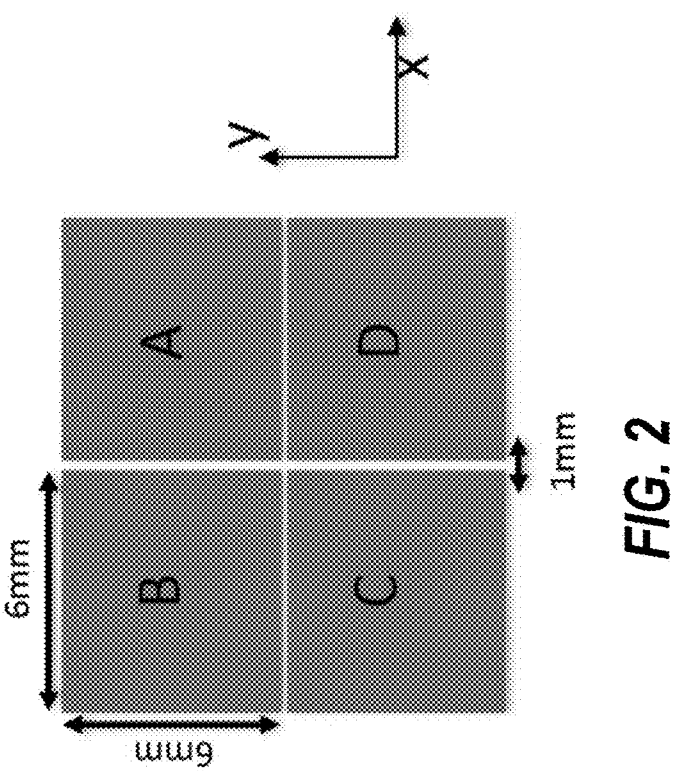
FIG. 2 illustrates a two by two quad cell, similar to FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is an optical communication system includes a laser, a fine pointing system, an optical sensor, and a controller. The fine pointing system is configured to direct an output of the laser in a direction according to a control signal. The optical sensor is configured to detect an optical signal impinging thereon and simultaneously produce a first output signal and a second output signal. The first output signal represents instantaneous photon flux of the optical signal impinging on the optical sensor. The second output signal represents a derivative of the instantaneous photon flux of the optical signal impinging on the optical sensor.

The controller is configured to receive the first and second output signals from the optical sensor. The controller is configured to generate the control signal for the fine pointing system according to the first output signal from the optical sensor. The controller is configured to generate a communication output signal according to the second output signal from the optical sensor.

Optionally, in any embodiment, the optical sensor includes a silicon photomultiplier.

The embodiments disclosed herein provide systems and methods for reducing both cost and power usage in a satellite-based optical communication link by combining sensors used for communication and pointing into a single package. Use of the Hemera optical architecture enables such systems to simultaneously provide high-sensitivity (down to single photons) and high dynamic range (thousands of photons) optical detection. High dynamic range is important for both pointing and communication. High sensitivity is important for long-distance links, i.e., between satellites in space.

These sensors may be made of silicon photomultipliers (SiPMs) which have solid state sensors with low voltage operation, single-photon quantification, and an insensitivity to magnetic fields. Such characteristics allow both communications to be combined into a single laser-detector combination. SiPM may be commonly used for bioimaging and lidar. The two output signals inherent to the SiPM architecture characterize the instantaneous photon flux and its derivative. These signals are denoted as the slow axis and fast axis signals, respectively. The simultaneous access to these signals enables pointing (slow axis) and free space optical communications (fast axis). The simulation of a 2×2 SiPM array scanned by a 2 mm diameter beam resulted in an angle accuracy of 23 μrads and a reduced SWAP by 50%. In order to achieve a bit error rate (BER) of $10^{-6}$, at a link of 1,000 km, the transmitted power must be at least 37.8 mW. The sensor performance may be evaluated for a 3U Cube-SAT cross-link. The SiPM sensor further resulted in a Noise Equivalent Angle (NEA) pointing precision of 1 μradian and communication a repetition rate of at least 80 MHz. CubeSats may be platforms, among others, that benefit from using the sensor disclosed herein. The small size and lower costs allow for mass production.

Figure 1:
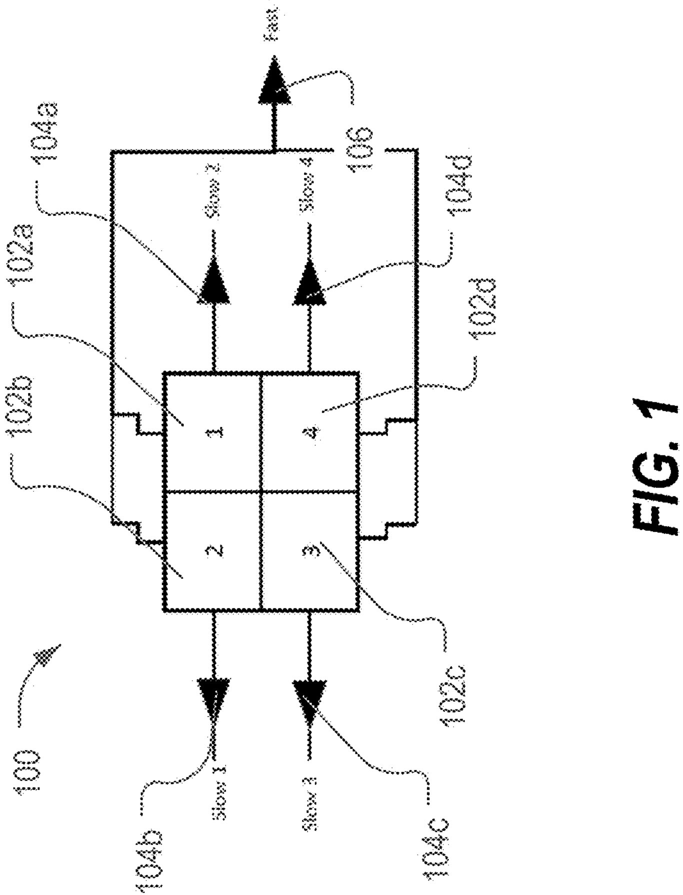
FIG. 1 illustrates an example schematic for a quad-cell photoreceiver.

FIG. 1 illustrates an example schematic for a quad-cell photoreceiver 100 (also referred to herein as photoreceiver array or SiPM 100). The quad-cell photoreceiver 100 may include four individual photocells 102 including a first photocell 102*a*, second photocell 102*b*, third photocell 102*c*, and fourth photocell 102*d*, arranged in parallel. In this example, the photocells 102 are arranged quadratically in a two-by-two arrangement. The photocells 102 may be arranged adjacent to another in close proximity to the next adjacent cell. In one example, and as indicated in the figure, the cells are spaced a predefined distance apart, such as 1 mm, for example. In some cases, the photoreceiver array 100 may include any number of photocells 102 arranged in an array, such as 16 photocells, 128 photocells, etc. Each photocell 104 may convert optical power into electrical current through a photo-diode and output a response upon receiving a photon. Photocurrent from each photocell may be sent to an amplifier prior to signal processing. This may aid in increasing the sensitivity of the cells.

Upon receiving an optical signal or photon, the respective photocell 102 may generate at least one first output signal and a second output signal. The first output signal may be a pointing signal 104 on a slow axis (individually labeled as 104*a*, 104*b*, 104*c*, 104*d*) representing instantaneous photo flux. The second output signal collective responsive signal may be combined for a free space optical signal 106 on a fast axis representing a derivative of the photo flux. The pointing signals may be at approximately 100 Hz-1 KHz and the free space optical signal 106 may be at approximately 200 MHz. The communication demonstration requires data rates of 20 Mbps and a link distance of 1,000 km.

FIG. 2 illustrates a two-by-two quad cell, similar to FIG. 1, having an example 6 mm×6 mm area and spaced by 1 mm from the adjacent cell. By placing SiPM cells in a segmented quadrant position configuration the SiPMs is able to report relative displacement of an incident beam in the x and y directions. The relative displacement in the x and y directions is calculated using:

$$x = \frac{(N_a + N_d) - (N_b + N_c)}{N_a + N_d + N_c + N_d}$$

$$y = \frac{(N_a + N_b) - (N_c + N_d)}{N_a + N_d + N_c + N_d}$$

where A, B, C, and D are the measured signals by each SiPM cell. The relative displacement is converted into an angular displacement by placing a lens between the incident light and the detector.

Figure 3:
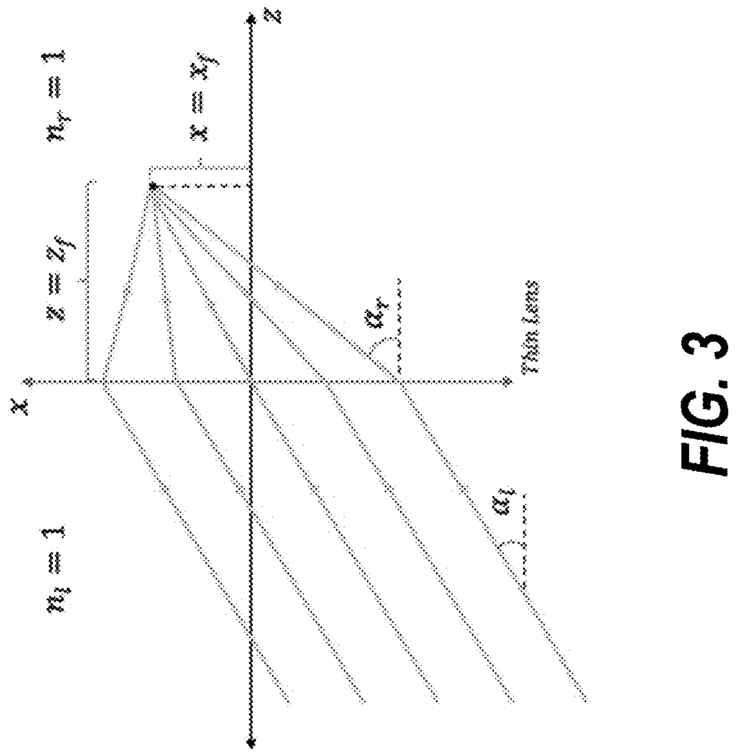
FIG. 3 illustrates an example x-y plane using a lens.

FIG. 3 illustrates an example x-y plane using a lens, where $n_l$, and $n_r$ are the indexes of refraction to the left and to the right of the lens, respectively. The focal length, f, occurs at $z=z_f$ with a lateral displacement of $x=x_L$, representing the point where all the incident rays converge.

The change in angle of incidence on the lens, $\sigma_L$ results in a lateral displacement $x_f$ as shown by:

$$\sigma = \tan\frac{x_f}{z_f}$$

The minimum detected angle is related to the wavelength of the light source and the width of the incident aperture, as well as the focal length.

In use, each receiver may appreciate certain noise, or fluctuations in the photo-current for that receiver. The fast output response or the second output signal of the SiPM is used as a high speed pulse detector for communication purposes. The SiPM high photo detection efficiently (PDE) and sensitivity to low-light signals (single-photon level) may be evaluated at various link distances to obtain a desired Bit Error Rate (BER), where BER is the rate of bits incorrectly received to total bits received. The BER may be shot noise created by statistical fluctuations in the optical signal.

In an analog system, a signal-to-noise ratio (SNR) may be measured while the BER may be measured in a digital system. The noise may affect the communication link. Further, photo detectors may generate dark current, or a small amount of current generated by photo detectors even in the absence of any photon. Such dark noise may be thermally generated and may be random. Other correlated noise may also be presented, including optical cross-talk and after pulsing. Such correlation noise may increase the gain fluctuation and in turn increase the excess noise factor (ENF). Thus, the main sources of noise in photodetectors contributing to the SNR are: thermal noise, shot noise, and dark count noise. For SiPMs, the main source of noise is shot noise. Shot noise is defined as the square root of the number of photons incident on the detector.

In this example, the dark noise may be low, and the photocells may have on off key modulation. A desired BER may be $10^{-6}$. Noise may be represented as:

$$BER = \frac{1}{2}\text{erfc}\sqrt{SNR},$$

$$SNR = \frac{N}{\sqrt{N}} = \sqrt{N}, \text{ and}$$

$$SNR = \sigma_{shot} = \sqrt{N_{photons}}.$$

where N is the number of photons incident on the SiMP. The required number of protons is determined using the above questions given the desired BER.

The total number of photons, N, is translated to a required power at the detector by first evaluating the energy per photon, scaling it by N, and then dividing it by the Tx repetition rate to obtain an average power.

Plank's formula my be used to calculate the photon energy, where c is the speed of light, h is Planck's constant, and λ is the wavelength of the Tx source laser:

$$E = \frac{hc}{\lambda}$$

Figure 4:
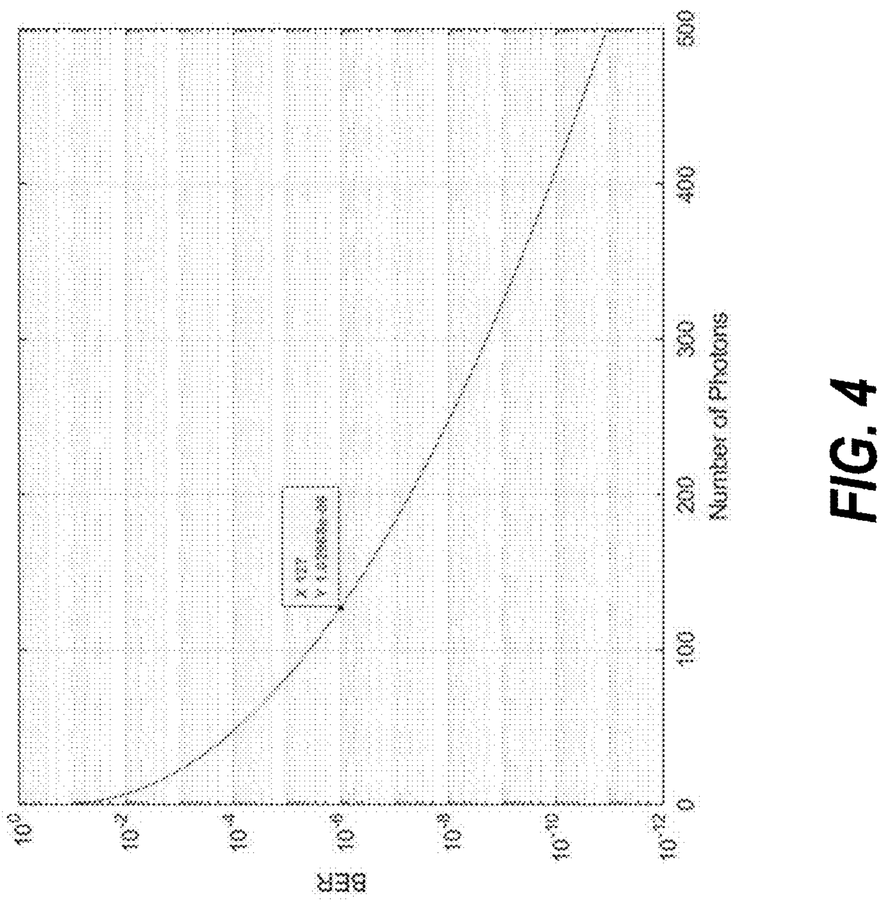
FIG. 4 illustrates a chart of example number of photons vs. bit error rate (BER).

FIG. 4 illustrates a chart of example number of photons vs. bit error rate (BER). As explained, each photocell 104 of FIG. 1 may convert optical power into electrical current through a photo-diode. However, each receiver may have noise and dark current, where:

$$\text{Dark Counts} = \frac{\text{Dark Count Rate}}{\text{Sample Time}}$$

Further parameters may include:

| Metric | Value |
|---|---|
| BER | 10^-12 |
| Pulse Rate | 200 MHz |
| Sample timel | Comms: 200 MHz<br>Pointing: 200 Hz |
| Photons | Comms: 125<br>Pointing: 125e6 |
| SNR | Comms: 11.18<br>Pointing: 1.118e4 |
| Dark Counts | Comms: .0005<br>Pointing: 500 |

In this example, for a BER of $10^{-6}$, the SiPM array has 125 photons incident on the sensor each pulse. In order to achieve a cross-link communication of 1000 km, the transmitted power must be at least 37.8 mW. Such power is lower than that required for other sensor systems, which may require up to 200 mW.

FIGS. 5-8 illustrate example layouts for a power link budget. Power link budgets can be generated for different crosslink ranges, such as those shown in FIGS. 5-7. Power Link Budget specifications may include:

Distance, L=1000 km, λ=525 nm, frequency, f=3 kHz. Other distances and ranges, as shown in the following figures, can provide pointing and communication functions for operation in satellites.

Figure 5:
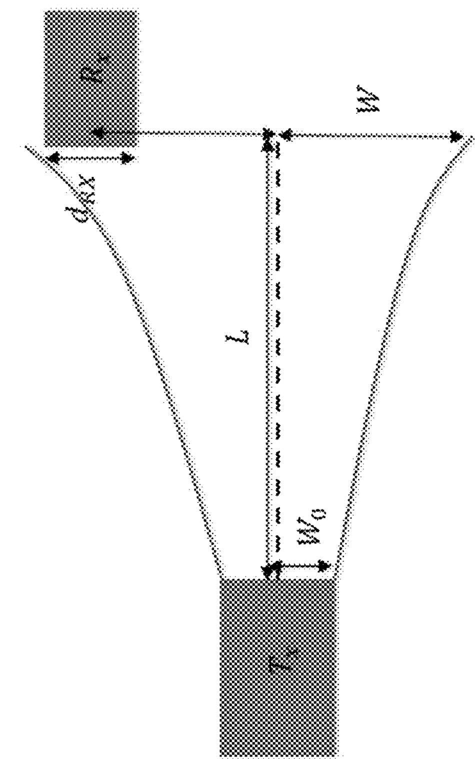
FIG. 5 illustrates an example layouts for a power link budget.

The diagram of FIG. 5 illustrates a transmitter Tx spaced a distance L from a receiver Rx, where:

$$r = L \cdot tran(\theta_{PT})$$

The power loss (W) in an optical cross-link (for this example power link budget) can be given by:

$$W(z) = W_o \cdot \sqrt{1 + \left(\frac{\lambda \cdot z}{\pi \cdot W_o}\right)^2}$$

Where $W_o$ is the beam waist radius, and λ is the wavelength of the Tx source, (here, 525 nm, as an example). In some cases, the power loss in an optical cross-link can be attributed to beam divergence. +

The mathematical expression for the irradiance of the transverse electromagnetic mode as a function of z, the propagation distance, and r, the radial distance from the center of the beam is:

$$I(r, z) = I_o\left(\frac{w_o}{w(z)}\right)^2 \cdot \exp\left(\frac{-2r^2}{w(z)^2}\right)$$

Where $I_0$, the intensity of the beam at its waist, is defined by $$(o) = \frac{2P_o}{\pi w_o^2}$$

thus:

$$I(r, z) = I_o\left(\frac{2P_o}{\pi w(z)^2}\right)^2 \cdot \exp\left(\frac{-2r^2}{w(z)^2}\right)$$

The path loss is calculated by taking the ratio of I(r, z)/I0 and converting to decibels:

$$\frac{I(r, z)}{I_o} = \left(\frac{w_o^2}{w(z)^2}\right)^2 \cdot \exp\left(\frac{-2r^2}{w(z)^2}\right)$$

Range of a Gaussian beam can be given by:

$$G_{range} = \frac{d_{RX}^2}{2 \cdot W^2}\exp\left(\frac{-2r^2}{W^2}\right)$$

where the path loss is −57 dB, and:

| Metric | Value |
|---|---|
| Laser Wavelength | 525 nm |
| Laser pulse rate | 200 Mhz |
| $w_0$ | 0.013 m |
| Link range | 1000 km |
| Path loss | 57 dB |
| Tx system loss | 3 dB |
| Rx system loss | 3 dB |
| SiPM loss | 3 dB |
| Np_rx | 125 photons |
| Ep_rx | 4.23e−17 J |
| Np_tx | 500e6 photons |
| Ep_tx | 1.89e−10 Jo |
| P_tx (average) | 37 mW |

Figure 6:
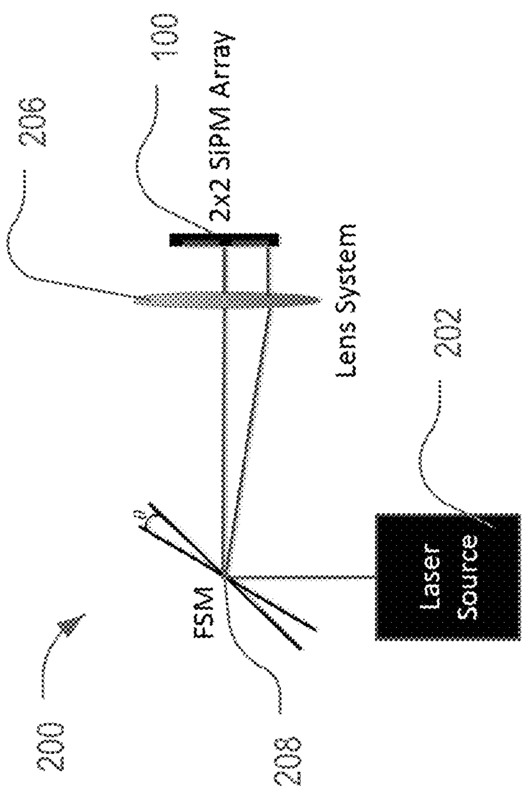
FIG. 6 illustrates another example layout for a power link budget.

FIG. 6 illustrates an example optical system 200 having a laser source 202, lens system 204, and the photoreceiver 100 described above using a fast-steering mirror (FSM) 208. The system 200, via the photoreceiver 100, is capable of characterizing the sensor gain at various frequencies. Further, the FSM is capable of measuring a noise equivalent angle θ. A lens system 206 may be arranged adjacent the photoreceiver 100. The lens system 206 may receive the optical signal from the laser source 202. The lens may bend the optical signal prior to the optical signal reaching the photoreceiver 100. The FSM may reflect the optical signal from the laser source 202.

Figures 7, 8:
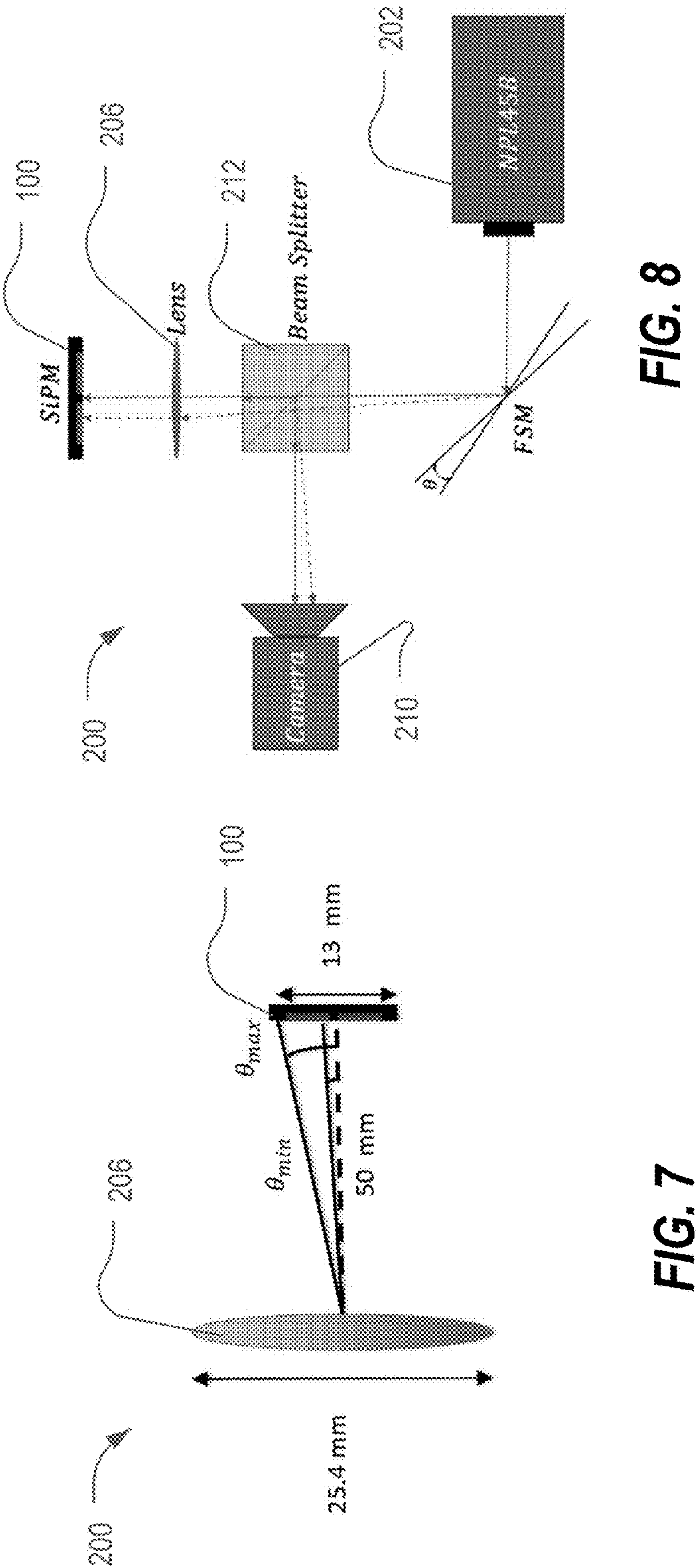
FIG. 7 illustrates another example layout for a power link budget.
FIG. 8 illustrates another example layout for a power link budget.

FIG. 7 illustrates another example of the optical system 200, showing the angular sensitivity, where $\theta_{min}$=23 μrads and $\theta_{max}$=±0.1222 rads. In this example, the lens system 206 may be approximately 50 mm from the photoreceiver 100. The lens system 206 may have a height of approximately 25.4 mm, and the photoreceiver 100 may have a height of approximately 13 mm. These dimensions are exemplary and other dimensions may be appreciated.

FIG. 7 illustrates another example of the optical system 200 also having a laser source 202, lens system 204, and the photoreceiver 100 described above using FSM 208. In this example the system 200 also includes a camera 210 and a beam splitter 212.

The pointing performance of the SiPM may be evaluated by certain simulations on the SiMP. The simulation outputs the dx and dy location of the scanning beam as well as the Noise Equivalent Angle (NEA).

Figure 9:
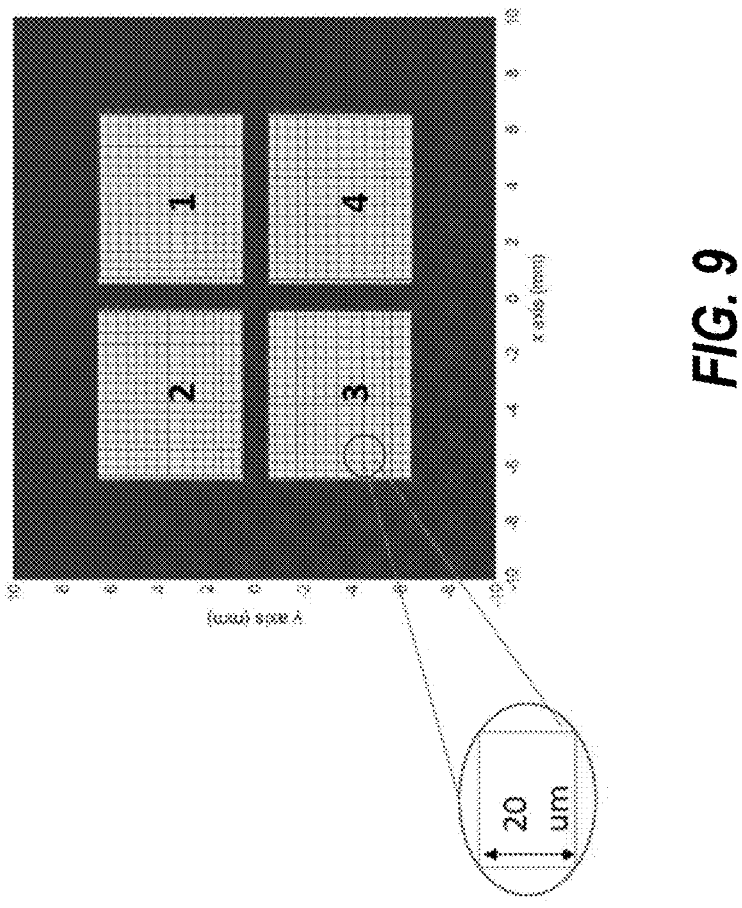
FIG. 9 illustrates an example x-y axis for the photoreceiver array.

FIG. 9 illustrates an example x-y axis for the photoreceiver array 100. The photocells 102 may be arranged along the x and y axis in a two by two arrangement. In this example, the focal length is 50 mm and the aperture is 24.5 mm. Each cell has an active area of 3 mm3 and a gap of 200 μm. The quadcell model in Matlab assumes a fill factor of 100%. FIG. 9 shows the quadcell model, where the four inner squares represent the active area of the detectors. The cell size and gap width are adjustable. The A, B, C, and D quadrants correspond to (+x, +y), (−x, +y), (−x, −y), (+x, −y) respectively.

Figure 10:
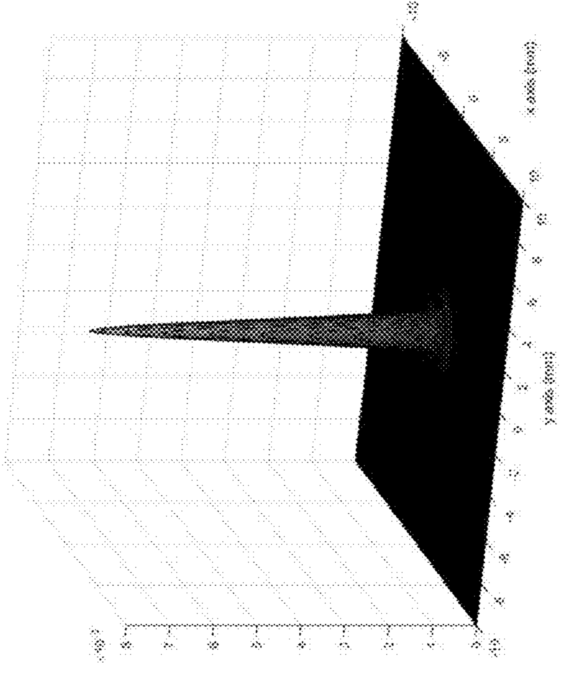
FIG. 10 illustrates a focused bam incident on the quad cell of FIG. 9.

FIG. 10 illustrates a focused bam incident on the quad cell of FIG. 9. The focused beam incident on the quadcell is modeled as a first order Bessel function. The Bessel function is normalized by the total number of photons per pulse, N. The beam's intensity and diameter are adjustable.

In order to evaluate the sensitivity of the quadcell at different beam angles, the simulation scans the beam across the quadcell's diagonal from (−x, −y) to (+x, +y) and from (−x, +y) to (+x, −y). The position of the beam on the quadcell is calculated using equation. As the beam shifts from one diagonal to the next, the sensitivity of the detector varies.

The reported positions by the quadcell, $x_{quad}$ and $y_{quad}$ are differentiated using the below to obtain the sensitivity of the detector at different beam angles:

$$s_x(x, y) = \frac{\partial x_{quad}}{\partial x}$$

$$s_y(x, y) = \frac{\partial y_{quad}}{\partial y}$$

The minimum detectable signal is related to the noise in the system. The SNR is calculated using:

$$SNR(x, y) = \frac{N_a + N_d + N_c + N_d}{\partial_A^2 + \partial_B^2 + \partial_C^2 + \partial_D^2}$$

Where the noise, $\sigma_{pixel}$, main component are shot noise, $\sigma_{shot}$, dark noise, $\sigma_{dark}$, and thermal noise $\sigma_{thermal}$:

$$\partial_{pixel} = \sqrt{\partial_{shot}^2 + \partial_{dark}^2 + \partial_{thermal}^2}$$

-continued $$\partial_{shot} = \sqrt{N_{photons}}$$

$$\partial_{dark} = \sqrt{f_{DC}/f_{update}}$$

$$\partial_{thermal} = \sqrt{N_{photons}}$$

The SiPM is modelled to update the pointing and communication signals at different frequencies: $f_{pntg}$ and $f_{comms}$. The number of samples over which the pointing signal can average is dependent on the ratio of both of these frequencies:

$$n_{ave} = \frac{f_{comms}}{f_{pntg}}$$

Ensemble averaging is used as a noise reduction technique for the pointing signal. The SNR is now:

$$SNR_{n_{ave}} = \sqrt{n_{ave}} \cdot SNR_i$$

The smallest detectable change in angle, or NEA, is calculated using the below equation. As a result of ensemble averaging increasing the SNR, the NEA decreases favorably. There is an increase of sensor sensitivity controlled by the pointing and communication update frequencies.

$$NEA(\theta_x, \theta_x) = \frac{1}{f_{PT} \cdot SNR} \sqrt{\frac{1}{S_x^2} + \frac{1}{S_y^2}}$$

Where $f_{PT}$ is the focal length of the spot incident on the quadcell. The NEA is evaluated for various beam spot sizes, quadcell pixel gap length, and incident power on detector.

In another example, pointing performance may be tested in a 2×1 pixel configuration instead of a 2×2 configuration due to lack of connections in the evaluation board.

In this experiment, a collimated laser beam with and optical power of enteroptical power is attenuated using natural density filters with an OD of OD in order to simulate the minimum power necessary for the quadcell to accurately report a pointing disturbance in the x and y directions. Laser light pulsing at 1 MHz is directed into the FSM mirror, where the smallest angular step for θx and θy is enterangular resolution. A 50/50 beamsplitter is placed right after the FSM, dividing the light into two beams, one incident on the quadcell and the other on the camera. The camera is used as an instrument to validate the angular beam direction driven by the FSM.

The FSM steers the pulsed light beam from the −x to +x with a step size of, deg, where the voltages of each pixel at each step are read and stored by the Oscilloscope. Measurements at each incident angle are then numerically differentiated as mentioned above, but in this scenario, only with Pixels A (+x) and B (−x).

On Camera an image is captured at each step, with a gaussian fit reporting the centroid location of the beam. The NEA of the SiPM is calculated. The experiment showcases how a SiPM can be used in a quadcell configuration as a pointing detector.

Figure 11:
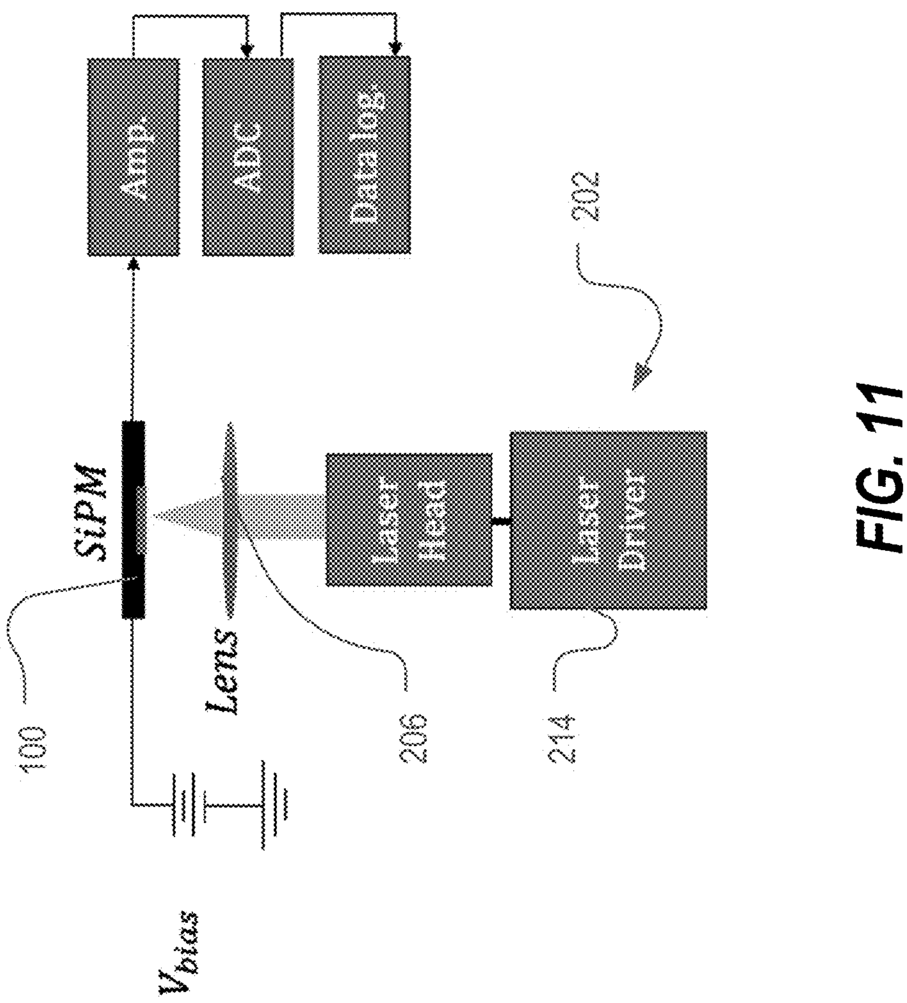
FIG. 11 illustrates an example arrangement for a high speed pulsing experiment.

FIG. 11 illustrates an example arrangement for a high speed pulsing experiment, where The SiPM is evaluated as a communication sensor by exposing it to high speed pulses in a low power environment. BER of $10^{-6}$ is set as a goal parameter and is converted into an average incident power on the detector.

The picosecond pulsed laser 202 has an average power of 20 mW. A natural density filter array with a total OD=6.3 filters enough power to only have 120 photons per pulse, close to our required number of photons N to achieve a BER of $10^{-6}$. A pulsed laser driver 214 is then used to test the responsivity of the SiPM at different repetition rates from 2-80 MHz. This experiment showcases the performance of a SiPM when high speed pulses are sent as a communication signal. The modulation scheme used is On-Off Keying (OOK).

FIGS. 12-17 illustrate SiPM simulation results. In this example, the simulation may have included a gap of 200 μm, driven by the geometry of the chosen SiPM. A wider beam in diameter results in a larger detectable range for pointing disturbances, but with a smaller angular resolution. A steeper slope represents a higher angular sensitivity in the quadcell. If the beam diameter is smaller than the gap, then the quadcell could fail to center the incoming beam disturbance.

Figures 12, 13:
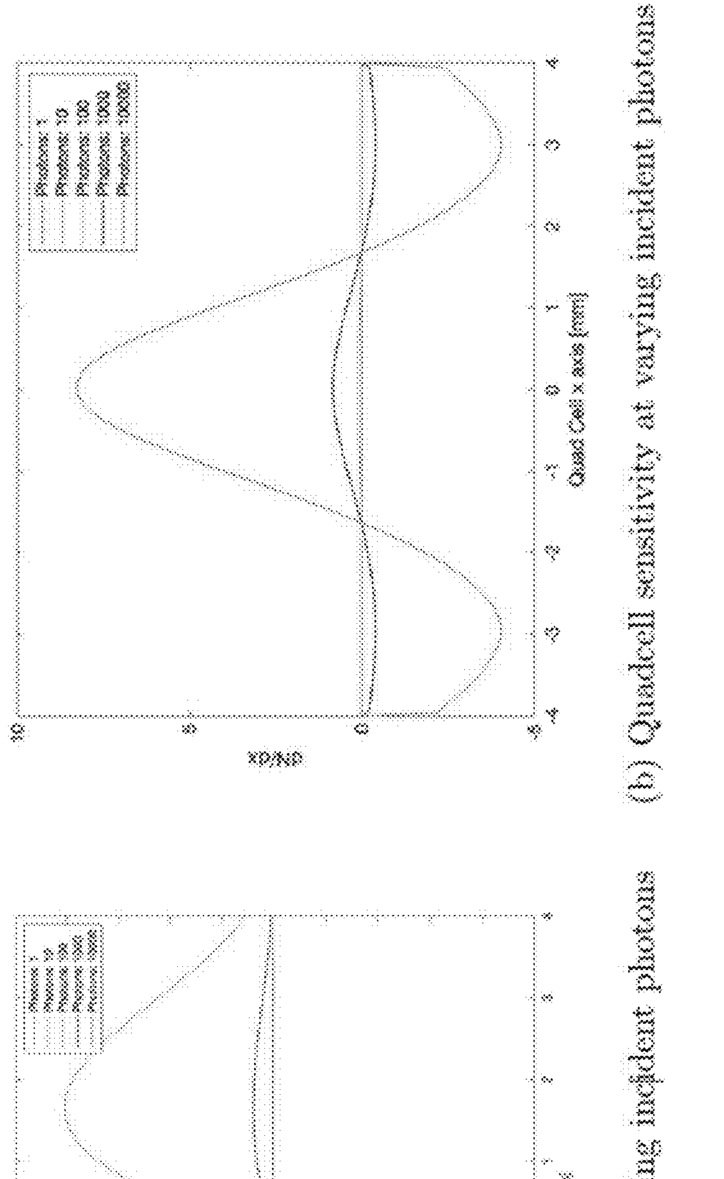
FIG. 12 illustrates a chart of an example quad cell response at varying incident photons.
FIG. 13 illustrates an example chart of quadcell sensitivity at varying incident photons.

FIG. 12 illustrates a chart of an example quad cell response at varying incident photons.

FIG. 13 illustrates an example chart of quadcell sensitivity at varying incident photons.

Figure 14:
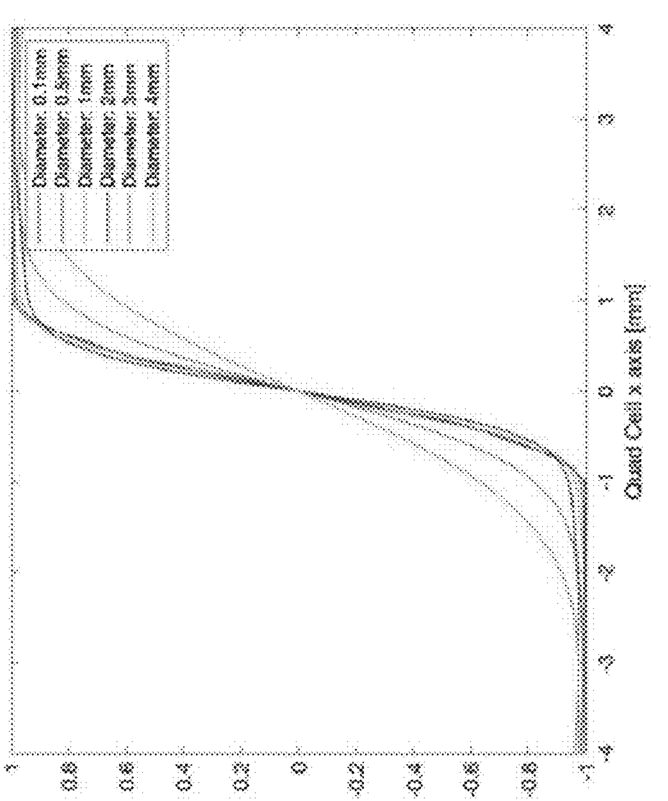
FIG. 14 illustrates an example chart of quadcell response at various beam diameters.

FIG. 14 illustrates an example chart of quadcell response at various beam diameters.

Figure 15:
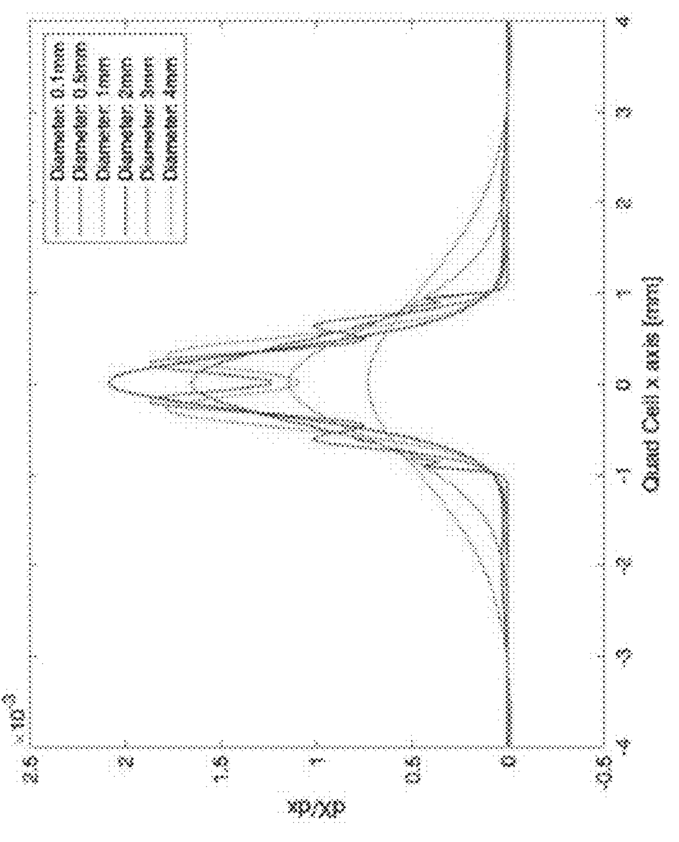
FIG. 15 illustrates an example chart of quadcell beam diameter sensitivity.

FIG. 15 illustrates an example chart of quadcell beam diameter sensitivity.

Figure 16:
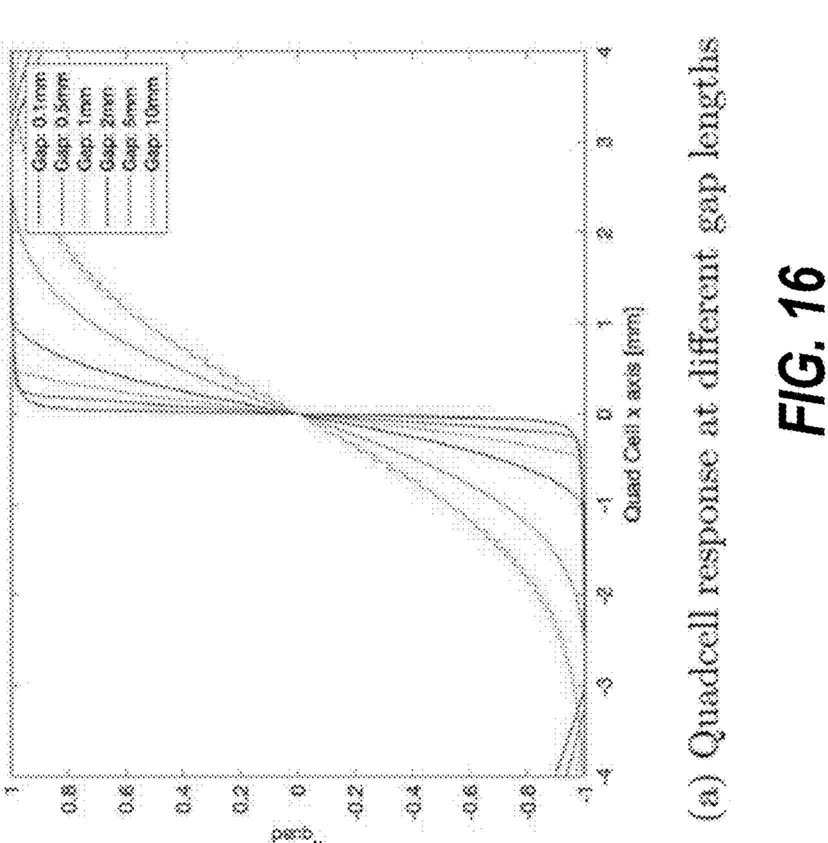
FIG. 16 illustrates an example chart of quadcell response at different gap lengths.

FIG. 16 illustrates an example chart of quadcell response at different gap lengths, where the gap length effects the sensitivity.

Figure 17:
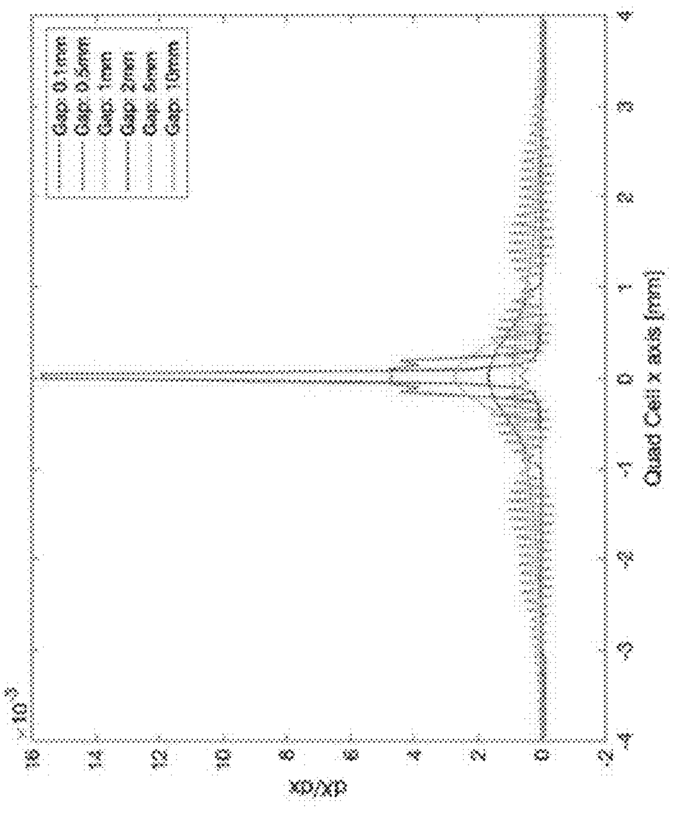
FIG. 17 illustrates an example chart of quadcell gap slope sensitivity.

FIG. 17 illustrates an example chart of quadcell gap slope sensitivity.

Figure 19:
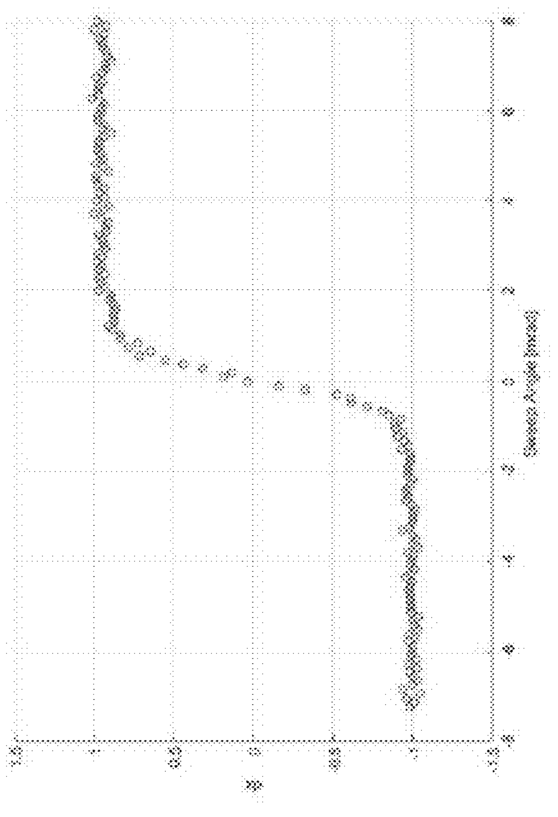
FIG. 19 illustrates an example chart of quadcell gap slope with an OD6 filter.
Figure 18:
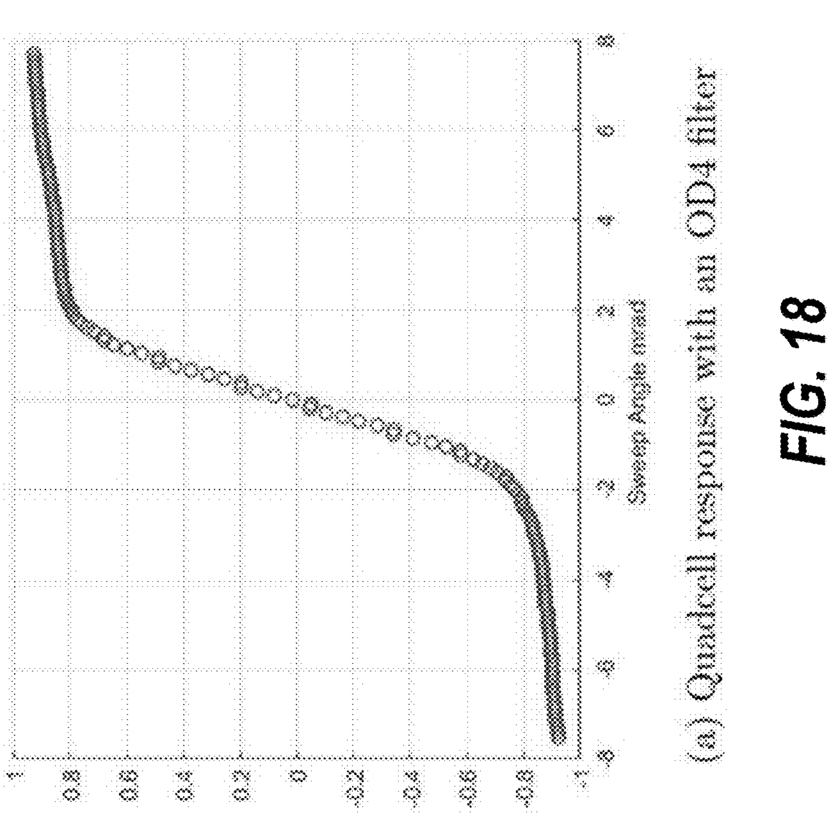
FIG. 18 illustrates an example chart of quadcell response with an OD4 filter.

FIGS. 18-19 illustrate SiPM pointing experiment results, where the experiment is done with a repetition rate of 1 MHz.

FIG. 18 illustrates an example chart of quadcell response with an OD4 filter.

FIG. 19 illustrates an example chart of quadcell gap slope with an OD6 filter.

While the invention is described through the above-described exemplary embodiments, modifications to, and variations of, the illustrated embodiments may be made without departing from the inventive concepts disclosed herein. For example, although specific parameter values, such as materials and dimensions, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

The controller or portions thereof may be implemented by one or more suitable processors executing, or controlled by, instructions stored in a memory. Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random-access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective items from one another and are not intended to indicate any particular order or total number of items in any particular embodiment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An optical sensor system for communication and pointing, comprising:

an optical sensor having photocells arranged in an array configured to receive at least one optical signal; and the optical sensor, in response to the at least one optical signal, generating a first output signal and a second output signal, wherein the first output signal is a slow output for pointing and represents instantaneous photon flux of the at least one received optical signal and the second output signal is a fast output for communication and represents a derivative of the instantaneous photon flux of the at least one received optical signal where the optical sensor operates as a dual communication and pointing sensor.

2. The sensor system of claim 1, wherein the optical sensor comprises a silicon photomultiplier.

3. The sensor system of claim 1, wherein each of the photocells are spaced from each adjacent photocell by a predefined distance.

4. The sensor system of claim 1, wherein the first output signal is a pointing signal is between 100 hertz (Hz)-1 Kilohertz (KHz).

5. The sensor system of claim 1, wherein the second output signal is a free space optical signal at 200 Megahertz (MHz).

6. An optical sensor for communication and pointing, comprising:

a plurality of photocells configured to receive at least one optical signal, in response to the at least one optical signal, configured to generate a first output signal and a second output signal, wherein the first output signal represents instantaneous photon flux of the at least one received optical signal and the second output signal represents a derivative of the instantaneous photon flux of the at least one received optical signal.

7. The sensor of claim 6, wherein the plurality of photocells are arranged in a quadratic matrix.

8. The sensor of claim 7, wherein the plurality of photocells include four photocells in a two-by-two quadratic arrangement configured to receive at least one optical signal.

9. The sensor system of claim 6, wherein the optical sensor comprises a silicon photomultiplier.

10. The sensor system of claim 6, wherein each of the photocells are spaced from each adjacent photocell by a predefined distance.

11. The sensor system of claim 6, wherein the first output signal is a pointing signal is between 100 hertz-1 Kilohertz (KHz).

12. The sensor system of claim 6, wherein the second output signal is a free space optical signal at 200 Megahertz (MHz).

13. The sensor system of claim 6, wherein each of the plurality of photocells has a quadrilateral shape.

14. An optical communication system comprising:

a laser;

a fine pointing system configured to direct an output of the laser in a direction according to a control signal;

an optical sensor configured to detect an optical signal impinging thereon and simultaneously produce a first output signal and a second output signal, wherein the first output signal represents instantaneous photon flux of the optical signal impinging on the optical sensor and the second output signal represents a derivative of the instantaneous photon flux of the optical signal impinging on the optical sensor; and a controller configured to:

receive the first and second output signals from the optical sensor;

generate the control signal according to the first output signal from the optical sensor; and generate a communication output signal according to the second output signal from the optical sensor.

15. The system of claim 14, wherein the optical sensor comprises a silicon photomultiplier.

* * * * *